(12) United States Patent
Taylor

(10) Patent No.: US 6,341,616 B1
(45) Date of Patent: Jan. 29, 2002

(54) FIRE PROTECTION FLUID RELIEF VALVE

(76) Inventor: Julian S. Taylor, 8300 SW. 8th St., Oklahoma City, OK (US) 73128

(*) Notice: Subject to any disclaimer, the term of this patent is extended or adjusted under 35 U.S.C. 154(b) by 0 days.

(21) Appl. No.: 09/688,595

(22) Filed: Oct. 16, 2000

(51) Int. Cl.[7] .............................. F16K 17/14; F16K 17/38
(52) U.S. Cl. ........................ 137/68.12; 137/70; 137/73; 137/80; 169/57; 169/58
(58) Field of Search ................................ 137/67, 68.12, 137/70, 72, 73, 75, 79, 80; 169/42, 57, 58; 239/75

(56) References Cited

U.S. PATENT DOCUMENTS

| | | | | |
|---|---|---|---|---|
| 1,960,272 A | * | 5/1934 | Lovekin | ...................... 137/73 |
| 2,637,333 A | * | 5/1953 | Houston, Jr. et al. | .... 137/68.12 |
| 4,896,690 A | * | 1/1990 | Taylor | .......................... 137/80 |
| 5,551,470 A | * | 9/1996 | Duvall | ..................... 137/68.12 |

FOREIGN PATENT DOCUMENTS

| | | | | |
|---|---|---|---|---|
| AU | 242584 | * | 12/1962 | .................... 137/73 |
| GB | 2100350 | * | 12/1982 | .................... 137/72 |

* cited by examiner

Primary Examiner—Michael Powell Buiz
Assistant Examiner—Ramesh Krishnamurthy
(74) Attorney, Agent, or Firm—Robert K. Rhea

(57) ABSTRACT

A fluid pressure and heat sensitive valve connected with a flow line includes a collapsible pin, normally maintaining the valve closed, which collapses to open the valve in response to fluid pressure above a predetermined limit and includes a fusible plug which melts in the event of a fire, releasing the pin to allow fluid pressure to open the valve.

8 Claims, 2 Drawing Sheets

FIRE PROTECTION FLUID RELIEF VALVE

BACKGROUND OF THE INVENTION

This invention relates to fluid control valves and more particularly to a high temperature fire hazard fluid release valve.

1. Field of the Invention

Relief valves for protecting equipment and piping under pressure greater than a predetermined value for releasing or stopping the flow of fluid are well known. However, there is a need for a heat responsive valve to be connected with a fluid conducting line which is responsive to excessive heat such as, heat generated by a fire in which a heat responsive element forms a fuse for moving a valve from a closed fluid flow position to an open position or vice versa.

2. Description of the Prior Art

The prior art generally reveals a plurality of heat responsive valves, commonly referred to as sprinkler valve heads, which are connected with a fluid fire retardant, usually water, which is released to control the fire in response to a predetermined temperature melting a fusible link maintaining the sprinkler head valve in a closed position which when melted by excessive heat allows fluid to be sprayed into a predetermined area for controlling fires.

This invention provides a valve which controls the flow of fluid by allowing fluid flow therethrough and responsive to the fluid being monitored by a heat fusible plug maintaining a fluid pressure responsive relief valve which monitors the fluid pressure, whether flowing or stopped, and releases the same in responsive to excessive fluid pressure but has the additional feature of a heat fusible plug maintaining a pressure responsive collapsible pin in a valve closed or open position in accordance with the type of valve being used whether inline permitting fluid flow or a right angle valve preventing fluid flow.

I am not aware of any prior art valve disclosing this pressure responsive, heat fusible plug type relief valve.

BRIEF SUMMARY OF THE INVENTION

A valve body having bolt flanges for connection with a pipeline forms a fluid passageway between the bolt flange ends. A body bore inline with the inlet port intersects the fluid passageway and forms a shoulder and sleeve-like valve seat mating and mismating with a piston type valve, having a piston rod slideably projecting axially outward through a central bore in a valve bonnet head. A pressure responsive collapsible pin projects axially outward from the end of the piston rod, opposite the piston and is slidable in a bore in a plate. The plate is supported in parallel spaced relation with the valve bonnet by a plurality of bolts forming a pin cage means. Sleeves surrounding the posts maintain the plate in spaced relation with the bonnet head and an axial threaded bore in the plate receives a bushing having an axial bore slideably surrounding the other end portion of the collapsible pin. An axial threaded opening in the plate bushing is filled with a heat fusible alloy, such as babbitt.

The principal object of this invention is to provide a pressure control relief valve having a fuse plug maintaining a pressure responsive collapsible pin holding a valve in a seated or unseated position which further includes a heat fusible plug which releases an end portion of the collapsible pin for sliding movement outwardly of the valve and allowing a valve to open for releasing fluid through the valve.

DETAILED DESCRIPTION OF THE INVENTION

Figure 1:
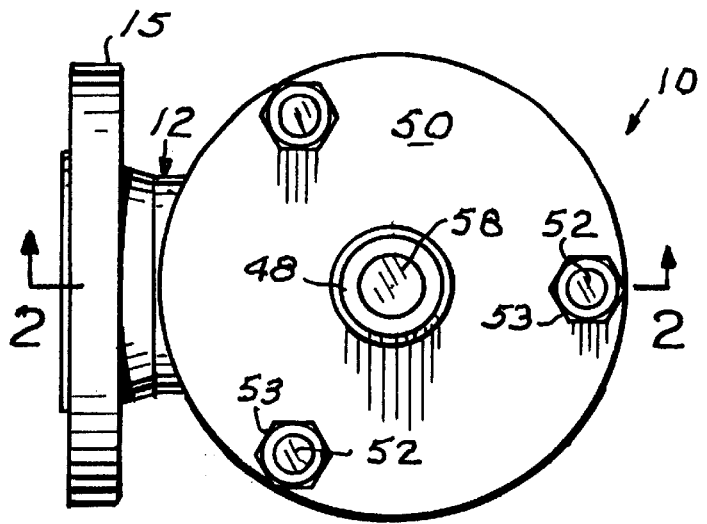
FIG. 1 is a top view.

The reference numeral 10 indicates the valve as a whole having a body 12 and an inlet bolt flange 14 normal to an outlet bolt flange 15 forming an inlet port 16 and exhaust port 18, respectively, and a fluid passageway 20 between the inlet and outlet ports. The wall forming the inward limit of the inlet port 16 defines a valve seat 22 for sealing with a valve and closing the fluid passageway 20 as presently explained. The valve body is counterbored inline with the inlet port 16, as at 24, forming a shoulder 25 at the inward limit of the valve seat 22. The end of the bore 24 opposite the inlet port is closed by a valve head or bonnet 26 having a flanged end 28 secured to the valve body by bolts 30. The bonnet 26 is centrally bored, as at 32, for receiving the stem 34 of valve means such as a piston valve 36. The piston valve is cooperatively received by the valve seat surface 22 and is provided with an annular outstanding flange 38 for contact with the shoulder 25. O-rings 39 seal the bonnet to the valve body and piston rod to the valve bonnet as well as the piston with the valve seat surface 22.

The pin cage means 40 comprises a collapsible pin 42 having a first end portion supported in a socket 44 in the end of the piston rod 34 projecting outwardly of the valve bonnet 26. The other or second end portion of the collapsible pin is nested by a central bore 46 in a plate bushing 48 threadedly received axially by a plate 50 maintained in spaced relation with the valve bonnet flange 28 by plurality three (3), in the example shown, of posts 52 and nuts 53 and secured at one end to the valve bonnet flange 28 with a like plurality of sleeve spacers 54 around the posts interposed between the valve bonnet and the plate 50.

The bushing 48 is similarly centrally bored and grooved or screw threaded, as at 56, communicating with the bore 46 containing the second end portion of the collapsible pin 42. The bore 56 cooperatively receives a fusible plug 58 formed from a relatively low temperature melting point alloy, such as babbitt, for the purpose presently explained.

The plug 58 may be poured, as molten metal into the threaded bore 56 or formed in a separate mold and inserted into the threaded bore 56. In either event the cooperating threads, on the inner periphery of the bore 56 and periphery of the plug 58 are believed necessary to insure a positive contact between the plug 58 and bore 56 sufficient to form a stop with a hard metal disc 59 embedded in the plug and interposed between the plug and the adjacent end of the pin 42 and initially fail in response to heat approaching the melting point of the circumference of the plug 58 thus allowing fluid pressure to move the piston 36 and open the fluid passageway and simultaneously eject the plug 58 by the adjacent end portion of the pin 42 in contact with the disc 59 and sliding through the bore 46. A conventional proximity fuse 35 is mounted on the bonnet to indicate opening action of the valve 10.

OPERATION

In operation, assuming the valve 10 has been assembled and installed as described in a fluid conductor. In the position illustrated by FIG. 2, the collapsible pin 42 maintains the piston valve 36 in flow passageway closed position against fluid under pressure. In the event of a fire and heat approaching the melting point of the fusible plug 58 the plug threads at least partially melts and the fluid pressure axially moves the piston off seat and axially moves the pin 42 ejecting the fusible plug 58 thus opening the fluid passageway 20 and exhausting fluid downstream.

Figure 2:
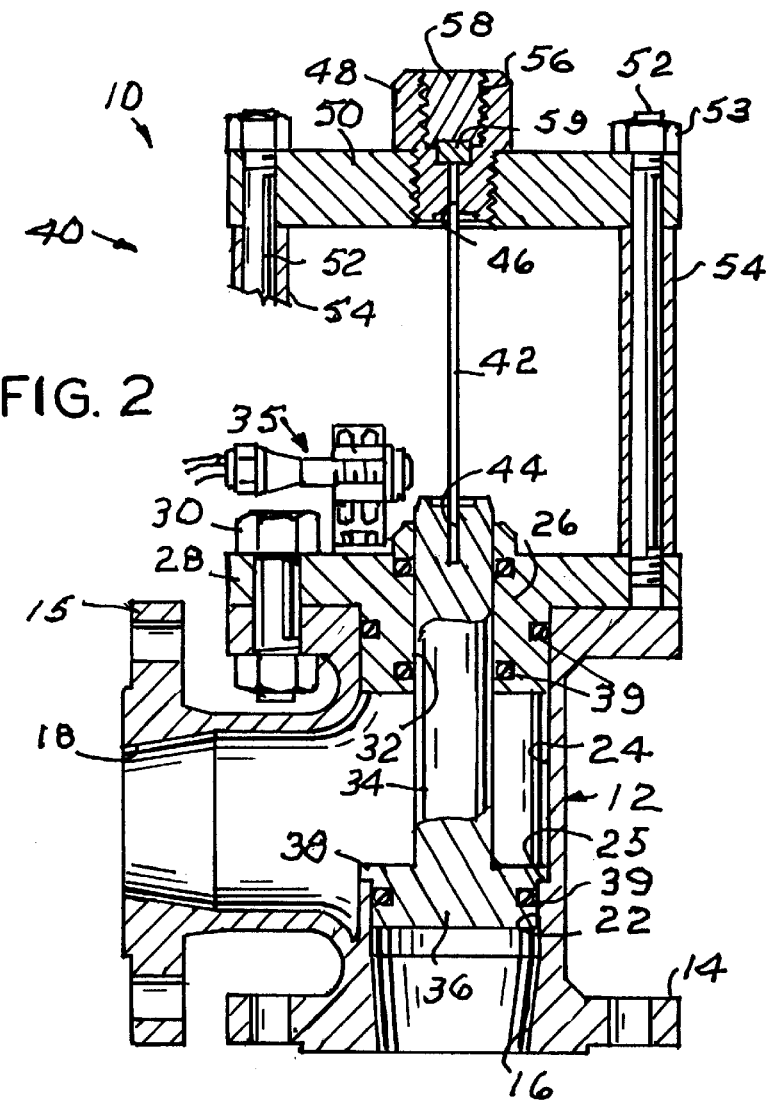
FIG. 2 is a vertical cross sectional view taken substantially along the line 2—2 of FIG. 1 illustrating the valve in closed position; and, FIG. 3 is a view similar to FIG. 2, illustrating the valve in open position.

The valve may be placed back in operation by manually moving the piston 36 to its fluid passageway closed position, and positioning the collapsible pin 42, in the position illustrated by FIG. 2. Installing a new fusible plug 58, not shown, in the threaded socket 56 of the plate bushing 48.

Figure 3:
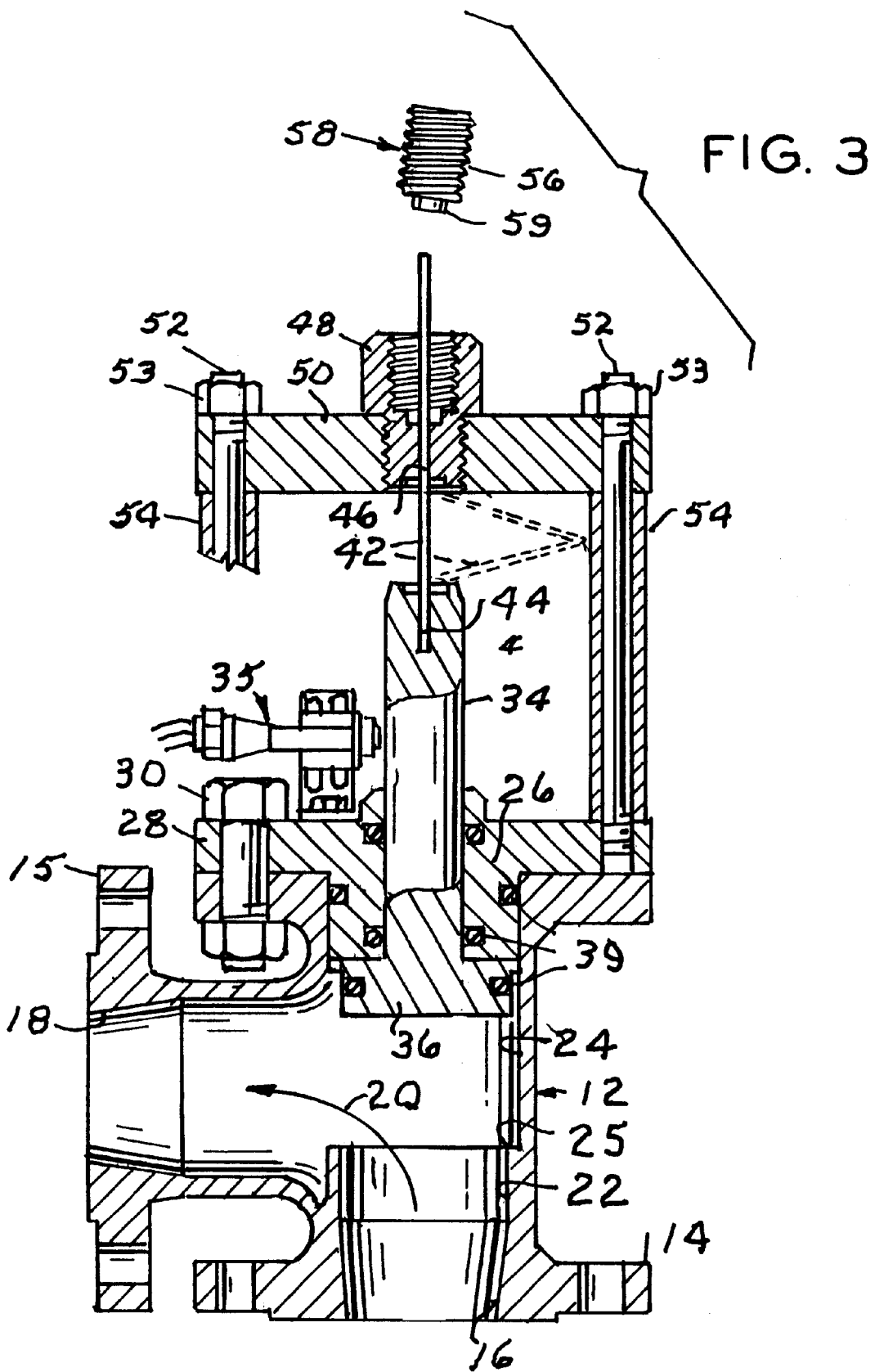

A second feature of the valve is monitoring excess fluid pressure by the collapsible pin 42. In the event the fluid pressure on the piston 36 reaches a predetermined value, the fluid pressure moves the piston off seat collapsing the pin 42 to the dotted line position of FIG. 3, thus opening the valve and exhausting fluid downstream. After the excess pressure problem has been corrected the collapsible pin may be replaced by installing a new pin 42, not shown, after removing the collapsed pin by unscrewing the plate bushing 48 from the plate 50, placing the replacement collapsible pin in the piston rod socket rod 44 and replacing the plate bushing 48 so its socket 46 surrounds the other end portion of the new collapsible pin.

Obviously the invention is susceptible to changes or alterations without defeating its practicability. Therefore, I do not wish to be confined to the preferred embodiment(s) shown in the drawing(s) and described herein.

I claim:

1. A fluid pressure and heat sensitive control valve, comprising:

a valve assembly including a right angle valve body having inlet and outlet ports forming a fluid passageway adapted to be interposed in a flow line;

a valve seat interposed in the passageway;

normally closed piston valve means including a piston valve seated on said valve seat and closing the fluid passageway and having a piston rod end portion slidably projecting outwardly of the valve body;

axially collapsible pin means including a collapsible pin having a first end in axial contact with the outwardly projecting portion of said piston rod for releasing said valve means and opening the fluid passageway in response to fluid pressure above a predetermined value collapsing the pin, said pin means including a plate supporting a fusible plug in axial contact with the end of said pin opposite said first end, whereby heat melting said plug allows fluid pressure to bias the valve means to a passageway open position.

2. The fluid control valve according to claim 1 and further including:

a bushing interposed between said plate and the fusible plug.

3. The fluid control valve according to claim 2 and further including:

said bushing having an inner periphery provided with cooperating screw threads or grooves forming contiguous contact of said plug with the inner periphery of said bushing.

4. The fluid control valve according to claim 3 in which said plug is a metal alloy.

5. A fluid pressure and heat sensitive control valve, comprising:

a valve assembly including a valve body having inlet and outlet ports forming a fluid passageway adapted to be connected with a fluid flow line;

a valve seat interposed in the passageway;

normally closed valve means including a piston valve for sealing with said valve seat and closing the fluid passageway and having a valve stem slidably projecting outwardly of the valve body;

axially collapsible pin means including a collapsible pin having a first end in axial contact with the outwardly projecting portion of said valve stem for normally biasing said valve means toward a fluid passageway closed position and releasing said valve means from sealing with said valve seat in response to fluid pressure above a predetermined value, said pin means including a plate supporting a fusible plug in axial contact with the end of said pin opposite said first end, whereby heat melting said plug allow fluid pressure to bias the valve means to a passageway open position.

6. The fluid control valve according to claim 5 and further including:

a bushing interposed between said plate and the fusible plug.

7. The fluid control valve according to claim 6 and further including:

cooperating screw threads in said bushing forming a contiguous contact of said plug with the inner periphery of said bushing.

8. The fluid control valve according to claim 7 in which said plug is a metal alloy.

* * * * *